US010653174B2

(12) United States Patent
Foroutanaliabad (10) Patent No.: US 10,653,174 B2
(45) Date of Patent: May 19, 2020

(54) METHODS AND APPARATUS FOR HULLING CROPS (71) Applicant: Zymex Industries, Inc., Merced, CA (US)

(72) Inventor: Ahmad Foroutanaliabad, Merced, CA (US)

(73) Assignee: Zymex Industries, Inc., Merced, CA (US)

( * ) Notice: Subject to any disclaimer, the term of this patent is extended or adjusted under 35 U.S.C. 154(b) by 287 days.

(21) Appl. No.: 15/681,404

(22) Filed: Aug. 20, 2017

(65) Prior Publication Data

US 2019/0053530 A1    Feb. 21, 2019

(51) Int. Cl.
 *A47J 43/00* (2006.01)
 *A23N 5/08* (2006.01)
 *B02B 3/00* (2006.01)

(52) U.S. Cl.
 CPC ...................................... *A23N 5/08* (2013.01)

(58) Field of Classification Search
 CPC .... A23N 5/00; A23N 5/08; B02B 3/00; B02B 3/04; B02B 3/045; B02B 3/08
 USPC ......... 99/568, 574, 575, 605, 606, 607, 608, 99/609, 617, 618, 629, 630, 602, 603, 99/610, 611
 See application file for complete search history.

(56) References Cited

U.S. PATENT DOCUMENTS

| 684,088 A | 10/1901 | Newman |
| 822,105 A | 5/1906 | Eklund |
| 867,276 A | 10/1907 | Jenkins |
| 951,653 A | 3/1910 | McDonald |
| 1,294,852 A | 2/1919 | Vaughn |
| 1,318,003 A | 10/1919 | Wheeler et al. |

(Continued)

FOREIGN PATENT DOCUMENTS

| CN | 203748607 | 8/2014 |
| CN | 204351023 | 5/2015 |

(Continued)

OTHER PUBLICATIONS

International Search Report (ISR) and Written Opinion from co-pending PCT application PCT/US2018/048175 dated Nov. 15, 2018 (PCT/ISA210, PCT/ISA/220, and PCT/ISA/237).

(Continued)

*Primary Examiner* — Hung D Nguyen
(74) *Attorney, Agent, or Firm* — Mark D. Miller (57) ABSTRACT Improved methods and apparatus for dry hulling or dry peeling harvested crops, particularly pistachio nuts, are disclosed. The methods and apparatus of the present invention provide crop harvesting with great efficiency resulting in consistently high percentages of hulled or peeled crops and low percentages of nut breakage, without increasing processing times regardless of the sizes of the crops being hulled or peeled. The methods and apparatus of the present invention also provide for a relatively small overall machine footprint, plus easy and efficient removal and replacement of the impingement drum to accommodate for different drum speeds, different crop sizes, different bolt patterns, different bolt sizes, and other variations allowing embodiments of the invention to be used on a wide range of nuts and vegetables of different varieties, sizes and shapes.

44 Claims, 6 Drawing Sheets

(56) References Cited

U.S. PATENT DOCUMENTS

| | | | |
|---|---|---|---|
| 1,757,762 A | 5/1930 | Williams | |
| 1,808,744 A | 6/1931 | Baudino | |
| 1,823,135 A | 9/1931 | Elliott | |
| 1,880,934 A | 10/1932 | Elliott | |
| 1,950,061 A | 3/1934 | Ott | |
| 1,946,783 A | 5/1934 | Deems | |
| 1,963,260 A | 6/1934 | Conrad | |
| 1,976,382 A | 10/1934 | Blewett | |
| 1,981,575 A | 11/1934 | Wallace | |
| 2,011,838 A | 8/1935 | Wilson | |
| 2,087,390 A | 7/1937 | Streun | |
| 2,100,301 A | 11/1937 | Mitchell | |
| 2,189,690 A | 2/1940 | Tigner | |
| 2,362,366 A | 11/1944 | Fowler | |
| 2,428,852 A | 10/1947 | Muir et al. | |
| 2,493,533 A | 1/1950 | Funderburk | |
| 2,599,892 A | 6/1952 | Brown | |
| 2,672,901 A | 3/1954 | Pearman et al. | |
| 2,865,415 A | 12/1958 | Pearman | |
| 3,266,101 A | 8/1966 | Brooks et al. | |
| 4,034,665 A | 6/1977 | McFarland et al. | |
| 4,353,931 A | 10/1982 | Volk | |
| 4,448,115 A | 5/1984 | Volk, Sr. | |
| 4,515,076 A | 5/1985 | Reznik | |
| RE31,979 E | 9/1985 | Volk, Sr. | |
| 4,874,097 A | 10/1989 | Argiriadis | |
| 5,245,918 A | 9/1993 | Volk | |
| 5,329,845 A | 7/1994 | Bichel | |
| 5,415,085 A * | 5/1995 | Thomson | A23N 5/00 99/574 |
| 5,720,395 A | 3/1998 | Schock et al. | |
| 5,879,734 A | 3/1999 | Broyles | |
| 6,098,530 A | 8/2000 | Hemry | |
| 6,209,448 B1 | 4/2001 | Hagen | |
| 6,382,427 B1 | 5/2002 | Nakhei-Nejad | |
| 6,397,737 B1 * | 6/2002 | Eisel | A23N 5/00 99/568 |
| 6,422,137 B1 | 7/2002 | Nakhei-Nejad | |
| 7,302,886 B2 | 12/2007 | Hamilton | |
| 7,357,952 B2 | 4/2008 | Foroutanaliabad et al. | |
| 7,695,750 B2 | 4/2010 | Foroutanaliabad et al. | |
| 7,717,033 B1 | 5/2010 | Kim | |
| 8,056,728 B2 | 11/2011 | Riise et al. | |
| 9,282,763 B2 | 3/2016 | Nakhei-Nejad | |
| 2002/0166464 A1 | 11/2002 | Warmack et al. | |
| 2007/0004480 A1 | 1/2007 | Taylor | |
| 2010/0062129 A1 | 3/2010 | Taylor et al. | |
| 2015/0223514 A1 | 8/2015 | Nakhei-Nejad | |
| 2015/0282518 A1 | 10/2015 | Tjerrild | |

FOREIGN PATENT DOCUMENTS

| | | |
|---|---|---|
| CN | 105029650 | 11/2015 |
| CN | 204888672 | 12/2015 |
| DE | 19801104 A1 | 7/1999 |
| GB | 1504 | 1/1914 |

OTHER PUBLICATIONS

International Search Report (ISR) and Written Opinion from co-pending PCT application PCT/US2018/046996 dated Nov. 19, 2018 (PCT/ISA210, PCT/ISA/220, and PCT/ISA/237).

Shamsi, M., et al, Performance evaluation of a bolt type pistachio hulling machine (Journal of Ag Technology 2011).

Ranford, Trevor et al., Trialling dry hulling of raw pistachios to improve pistachio processing (Horticulture Innovation Australia Ltd, 2015).

Khodabakhshian, R. et al., Design and Manufacture of a Pistachio Peeling Machine (World Applied Sciences Journal 11 (8): 930-937, 2010).

Khodabakhshian, Rasool et al., Performance Evaluation of a Centrifugal Peeling System for Pistachio Nuts (Int'l. Journal of Food Engineering, 2011).

* cited by examiner

(TOP VIEW)
FIG. 3

(SIDE VIEW)
FIG. 3 A

METHODS AND APPARATUS FOR HULLING CROPS

FIELD OF THE INVENTION

The present invention relates to methods and apparatus for hulling or peeling harvested crops, and more particularly to methods and apparatus for removing hulls from pistachio nuts without the use of water.

BACKGROUND OF THE INVENTION

It is well known that harvested nuts should generally be processed and hulled within a relatively short period of time after harvest. Pistachio nuts are particularly problematic in that if the hulls of pistachio nuts are not promptly removed from the shells after harvest, the light color of the shell may become blemished, giving the pistachio nut a less attractive appearance, and reducing its market value. In addition, there is a bond between the hulls and shells of pistachio nuts, making it more difficult to remove the hulls, especially if the pistachio nuts are not fully ripened.

Modern growing practices have resulted in large volumes of nuts being harvested at or around the same time, requiring large scale hulling and processing to be accomplished during a relatively short window of time. Accordingly, numerous mechanical devices and machines have been developed for large scale processing and hulling of nuts. It is desirable for such nut harvesting machines to avoid nut breakage as much as possible, to provide efficient processing (hulling/peeling) of nuts, to provide a high percentage of processed nuts, to provide a good ratio of capacity relative to machine foot print, and to provide consistent performance regardless of nut sizes and/or nut varieties. Unfortunately, current pistachio dry hulling machines are unable to meet one or more of these standards, resulting in losses from unprocessed nuts, broken or damaged nuts, and/or unacceptably lengthy processing times.

Figure 1:
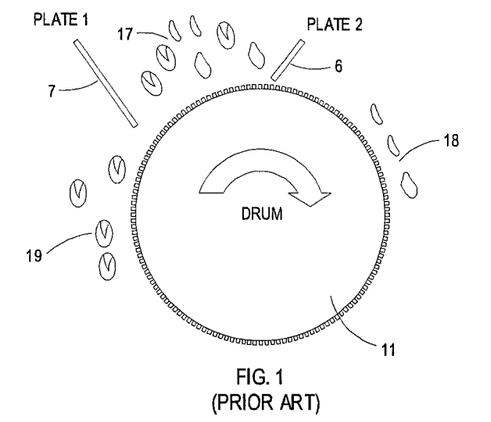
FIG. 1 is a partial side schematic view of a prior art hulling apparatus.

Many existing dry nut hulling machines include a rotatable drum having a pattern of protrusions or bolts on the surface thereof, a hopper that feeds the nuts into contact with the drum, the hopper including a front plate and a back plate for guiding the nuts. See, Shamsi, M., et al., Performance evaluation of a bolt type pistachio hulling machine, Journal of Agricultural Technology, 2011 Vol. 7(1), 57-62 (2011). See FIG. 1.

In such systems, the hulls of pistachio nuts are removed from the shells as a result of the impingement of the protrusions on the surface of the drum against the hulls. In such machines, a back plate ("Plate 2" of Shamsi) is located in the upper half circumference of the drum in one quadrant, and a front plate ("Plate 1" of Shamsi) is located in an adjacent upper quadrant upstream of the direction of drum rotation. Nuts are fed into the hopper area between the front and back plate. As the drum is rotated, the nuts are urged toward the back plate, which is positioned above the protrusions on the drum. The nuts are impinged by the protrusions on the drum, causing the hulls to be cut, sliced and/or sheared away from the nut shells. The hull slices or peels ("Skin discharge" of Shamsi) then pass through a gap between the back plate and the drum. This gap is too small for the hulled nuts to exit, so they are forced upward against the back plate until they fall back toward the drum, where they move in a rotational direction that is counter to the rotation of the drum. As drum rotates in one direction, it causes a counter rotation of nuts that are on the drum and trapped by the front and back plate to rotate collectively in the opposite direction of the drum rotation in a semi-fluid fashion. Eventually the hulled nuts ("Hulled discharge" of Shamsi) travel toward the front plate, and exit through a different gap between the front plate and the drum. The front plate therefore acts as a "sizer" for the nuts being processed, allowing peeled nuts to pass through it but not unpeeled nuts. The opening size of this gap determines the maximum diameter of nuts that may exit from the machine. Unfortunately, in many cases (particularly when a wider gap is used for larger nuts), it is possible for smaller un-hulled nuts to also exit through this gap between the front plate and the drum, resulting in fewer nuts actually being processed by these machines, thereby lowering the percentage of usable, hulled nuts.

As noted in Shamsi et al, the tested pistachio hulling machines only processed an average of approximately 73.8% of nuts, with an average of approximately 25.5% of nuts remaining unprocessed. Thus, approximately one quarter of all nuts entering such machines were not processed. It is therefore desirable to improve the percentage of nuts actually processed by pistachio and other nut hulling machines without increasing processing time or nut breakage.

One attempt at improving nut hulling is found in U.S. Patent Publication No. 2015/0223514 (Nakhei-Nejad—'514). The '514 application discloses a hulling plate that may be adjusted to establish a gap between the hulling plate and the drum through which removed hulls to exit from the machine, and a separator plate that may also be adjusted to establish a different gap between the separator plate and the drum through which hulled or peeled nuts may exit from the machine. The sizes of these gaps are not disclosed, although in one embodiment the separator gap is angled such that it is wider at one end, and a helical pattern of protrusions is provided on the drum which urges the nuts from one end of the drum to the other, where the wider gap is located. Unfortunately, the invention of the '514 application does not appreciably improve the percentage of nuts actually hulled, and the gradually increasing separator gap will allow many unprocessed nuts through. In particular, the separator gap of the '514 application plate still remains a sizer as it only allows nuts to exit based on their size at any given point on the drum. So, if a particular size nut that is not peeled by the time it reaches the gap having a size bigger than the nut diameter, that unpeeled nut will fall through unprocessed; and a nut that is peeled early in the process cannot exit until it reaches a part of the opening that is wider than its diameter. Also, the front and back plates of the '514 application are located in different quadrants.

Another attempt at improving nut hulling is found in U.S. Patent Publication No. 2015/0282518 (Tjerrild—'518). The '518 application discloses adjusting the position of the back plate in a range of between 10° and 80° along the circumference of the drum relative to horizontal, and tilting the back plate anywhere from positive 10° to negative 15°. The back plate has a lower cutting edge that is adjustably positioned approximately 1 mm above the drum protrusions. The '581 application is silent with respect to the position of the front plate relative to the drum protrusions. In the '518 application, the back plate is located in one quadrant (18), and the front plate is located in another quadrant (16). The '518 application discloses the use of a chevron or herringbone pattern of protrusions which contact the nuts at an oblique angle and urge the nuts toward the center of the drum. Unfortunately, the invention of the '518 application does not appreciably improve the percentage of nuts actually hulled, does not compensate for different sized nuts, may result in undesirable accumulation of un-hulled nuts on the back plate, and may cause substantial nut breakage at the back plate. Lateral removal of the drum also requires removal of one or both of the plates first.

Accordingly, there remains a need in the nut industry, and particularly in the pistachio industry, for automated hulling machines which provide a low percentage of nut breakage (less than 1%), high peeling efficiency, a high percentage of processed nuts (greater than the average of 73.8%), a good ratio of capacity relative to machine foot print, and consistent performance regardless of nut sizes and/or nut varieties. The apparatus and methods of the present invention address all of these needs.

SUMMARY OF THE INVENTION

The present invention includes methods and apparatus for hulling harvested nuts, particularly pistachio nuts, with great efficiency resulting in consistently high percentages of hulled nuts (90% or higher) and low percentages of nut breakage (less than 1%) regardless of the sizes of the nuts being hulled without increasing processing times. Embodiments of the present invention may also be used to peel vegetables such as, without limitation, carrots and potatoes without use of water. The methods and apparatus of the present invention also provide for a relatively small overall machine footprint, plus easy and efficient removal and replacement of the impingement drum, allowing for the use of different bolt patterns, different bolt sizes, and other variations so that embodiments of the invention may be used on a wide range of nut and vegetable varieties, sizes and shapes (crops).

Embodiments of the invention are designed to increase the number of impingements (hits or contacts) between protrusions on the drum and the crops being processed, without increasing breakage, and with little or no increase in processing times. This is accomplished using one or more of the following aspects of the invention independently or in conjunction with each other: (1) a high starting position for the back plate at or near top dead center, (2) a vertical or very steep angle of the back plate, (3) a vertical or very steep angle of the front plate, (4) front and back plates in relatively close proximity to each other, (5) an adjustable central opening in the front plate, (6) a pattern of protrusions on the drum which gently urge the nuts toward the central opening in the front plate, and/or (7) specially shaped protrusions on the drum which avoid nut breakage and improve nut peeling. Among other things, each of these aspects alone and/or in conjunction with some or all of the others has the effect of causing a tighter and faster counter rotation of the crops being processed in different embodiments of the invention, which increases the number of drum impingements within the same traveling distance. In some embodiments of the invention, the back plate is located at top dead center or in the same quadrant as the front plate which facilitates easy sideways removal of the drum in a direction away from the front and back plates, without having to remove either plate.

Embodiments of the invention include methods and apparatus wherein the bottom or starting position of the adjustable back plate relative to the drum is located at a position directly above the drum at or near top dead center (12:00 on a clock face). In some embodiments, the bottom of the back plate may be located as much as about 3 degrees down from top dead center in the same quadrant as the front plate.

In embodiments of the invention, the bottom or starting position of the adjustable front plate relative to the drum is always located upstream from the back plate with respect to the rotation of drum. In most embodiments, the bottom or starting position of the front plate is generally not more than about 60° down from vertical (not lower than about 10:00 on a clock face, if the drum is rotating clockwise; or 2:00 if rotating counter-clockwise). It is to be appreciated that in embodiments of the invention, the front and back plates are relatively close to each other, thereby creating a tighter and faster counter rotation of the crops being processed, resulting in more impingements of the crops against the protrusions on the drum in a given time interval.

In some embodiments, the angle of the back plate may be zero (i.e., it is vertical). In other embodiments, the back plate may be tilted from the bottom (pivoted) at an angle of anywhere from about 0° to about 15°, such that the top of the back plate is angled away from the front plate. It has been observed that crops tend to accumulate on the back plate if it is tilted at an angle of 20° or more, resulting in a preferred range of between about 0° and about 15°. The high positioning and small angle of the back plate accomplishes two things. First, these aspects generally prevent crops from accumulating against the back plate as the drum is turning. Instead, the crops readily fall down by gravity back onto the drum into a tight and fast moving rotational pattern that is in the opposite from the direction of the rotational direction of the drum itself. This results in an increased number of impingement of the crops against the protrusions on the drum in a given time frame and over a fixed lateral distance. Second, having the back plate at the top or in the same quadrant as the front plate allows easy sideways removal of the drum in a direction away from the front and back plates, without having to remove either plate. This facilitates easily and quickly changing out the drum, replacing it with another drum having a different diameter, different bolt shape and/or different bolt pattern, or for maintenance, inspection or cleaning.

In all embodiments, the gap between the bottom of the back plate and the drum surface is adjustable so as to allow for peels or removed hull fragments to exit through this gap, while preventing hulled nuts or vegetables from also exiting through the gap. In preferred embodiments used with pistachios, this gap may be from between about 3 mm and about 5 mm high. Although this gap is not necessarily dependent on the height of the protrusions on the drum, in some embodiments it may be approximately 1 mm above the tops of those protrusions. In other embodiments where larger crops are being hulled or peeled, the gap may be between about 5 mm and about 8 mm high. In embodiments of the invention, the back plate itself is preferably made from a flat sheet of stainless steel plate, which is relatively inexpensive and easily replaceable; although it may be made from other suitable materials. It is to be appreciated that the back plate of embodiments of the present invention requires neither a cutting edge as described in the '518 application, nor the type of sturdiness as described in the '518 application. This is because in embodiments of the present invention, most if not all of the peeling and/or hulling is performed by impingements between the crop and the drum bolts. In addition, the high starting position of the back plate in embodiments of the present invention takes substantial load off of this plate which in turn eliminates the requirement for highly sturdy material.

Figure 4:
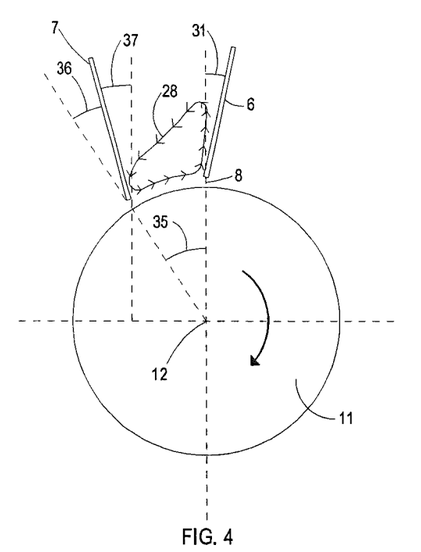
FIG. 4 is a schematic view showing exemplary angles $\alpha, \beta$ and T with respect to the front plate and back plate of an embodiment of the invention.

In embodiments of the present invention, it has been determined that three different angles are important to improved throughput and reduction in breakage (see FIG. 4). The first angle (alpha or α) is the location of the bottom of the front plate relative to the bottom of the back plate taken from the center of the drum. By way of example, and without limitation, for an embodiment with a 20" drum having a radius of 10" (ten inches) where r=10, and a back plate having its bottom located at top dead center, it has been determined that for hulling pistachios a preferred angle alpha (α) should be approximately 37°. It is therefore possible to calculate the distance between the bottoms of the front and back plates in this example to be approximately 6.45 inches, with a drum having a radius of 10 and the plates being 37° apart. [Drum circumference is 2 πr which is 2×3.14×10=62.8 inches. So 37 degree would be 62.8×(37/360) or 6.45 inches.]

The next important angle (beta or β) is the angle of the front plate itself toward the back plate, based on the position of the front plate along the drum. It has been determined that this angle should almost always be approximately 27° in the direction toward the back plate when processing pistachio nuts.

The final angle the tilt (T) is the angle between the front plate and the vertical line at that point of the drum. The relationship between the three angles is described in the following formula: Alpha−beta=T (α−β=T). However, T should generally not be greater than 20° because any larger tilt could result in piling up (dead zones) of crops against the front plate, and T should not be less than zero as it could lead to nut breakage.

So, in an exemplary embodiment, if the bottom of the front plate is located 27° down from top dead center (α=27), it's starting position would be extending out radially at 27°; it would then be slanted 27° toward the back plate (β=27), which would result in bringing the front plate to vertical (T=0). In a preferred embodiment for hulling pistachios, if the bottom of the front plate is located 37° down from top dead center (α=37), it's starting position would extend out radially at 37°; it would then be slanted 27° toward the back plate (β=27), which would result in the front plate having a tilt of 10° (T=10) away from vertical. In another embodiment, if the bottom of the front plate is located 47° down from top dead center (α=47), it's starting position would extend out radially at 47°; it would first be slanted 27° toward the back plate (β=27), which would give the front plate a tilt of 20° away from vertical (T=20); however since crops tend to accumulate on any plate having a tilt of more than about 15°, the 20° tilt would not be preferable. Since beta is almost always 27 degrees for pistachios, and T may not be greater than 20 or less than zero when pistachios are being processed, then α=27=T or α=T+27. Based on this formula the possible range for angle a would be 27 (when T=0) to 47 degrees (when T=20). So in this example, if angle α is selected to be 40 degrees, then angle T would be 13 degrees (40−27=13). It is to be appreciated that in this example, any front plate located 42° or more down from top dead center or located 27° or less could lead to increased pistachio nut breakage and/or dead zones on the plates. When hulling pistachios on a drum having a 10" radius, a preferred location for the bottom of the front plate is approximately 37° down from top dead center.

In some embodiments, the angle of the front plate may be zero (i.e., it is vertical). In other embodiments, the front plate may be tilted from the bottom (pivoted) at an angle of anywhere from about 0° to about 15°, such that the top of the front plate is angled away from the back plate. In most embodiments, the bottom of the front plate is located somewhere between about 25° and about 50° down from top dead center, preferably between about 27° and about 42°, upstream of the back plate, the preferred locations being relatively close to the back plate, but also depending on the size (circumference) of the drum itself as well as the particular crop being processed.

In embodiments of the invention, there is an adjustable gap between the bottom of the front plate and the drum. However, as described more fully below, embodiments of the invention also include an adjustable central opening in the front plate which provides a primary exit for crops that have been hulled or peeled. Therefore, in some embodiments, the gap between the front plate and the drum surface is set at a minimal height (e.g. 5 mm when the bolts on the drum are no more than 4 mm tall) in order to prevent crops from exiting through this gap so that they instead exit through the central opening. In embodiments of the invention, the front plate is preferably made from a flat sheet of stainless steel plate, which is relatively inexpensive and easily replaceable; although it may be made from other suitable sturdy materials.

Embodiments of the invention include a central opening in the front plate through which processed crops may exit. This opening is located on the front plate, near the center, above the drum. The length and width of this opening may be varied to accommodate different crop processing as described more fully below. In preferred embodiments, the length and width of this opening may be varied using one or more adjustable gates. This allows the size and position of the opening to be adjusted in advance, or in real time during processing in order to respond to the peculiarities of a particular batch of nuts or vegetables being processed. In other embodiments, the size and position of the front plate opening may be pre-determined, based on historical information such as previous hulling operations or the desires of the processor operator, in which case a front plate having an opening in a pre-determined fixed position may be used.

Figure 6:
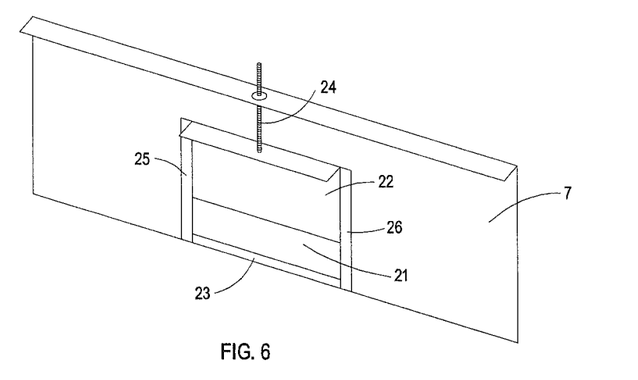
FIG. 6 is a side perspective view of an embodiment of a front plate in an embodiment of the present invention.
Figure 8A:
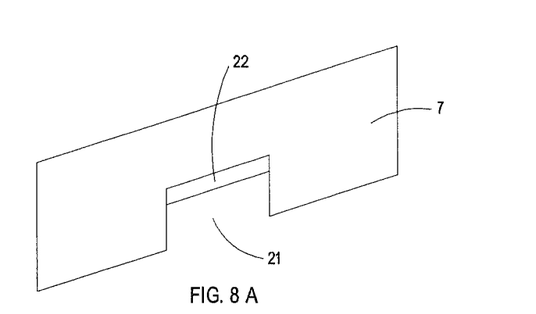
FIGS. 8A-8C are views of different embodiments of the front plate showing different positions for the opening and gates thereon.

In these embodiments, adjustment of the height of the central opening on the front plate may be accomplished using one or two adjustable gates. In many embodiments, a first adjustable gate is provided above the opening (upper gate) which may be raised to increase the size of the opening, or lowered to decrease the size of the opening. In most embodiments, a second gate may also be provided below the opening (lower gate) which prevents crops at or near the drum surface from exiting through the opening (see, e.g., FIG. 6). It is to be appreciated that by coordinating the positions of these two gates, the opening between the gates may be raised or lowered relative to the drum. Thus, by increasing the heights of the first and second gates, the opening is moved higher such that crops near the top of the counter rotation exit the machine, while crops at or near the drum surface are likely to receive additional impingements which may be desirable for more thorough processing (hulling/peeling) of the crops in certain situations. Similarly, by lowering the heights of the first and second gates, the opening is moved lower such that crops in lower levels of the counter rotation are allowed to exit the machine, which may be desirable if the crops require fewer impingements for peeling. (See FIG. 8.)

It is generally desirable to allow crops from the top of the counter rotation to exit through the front plate opening because it gives the operator several important controls. First, it allows the operator to visually see in real time what is being discharged hence allowing the operator to make a real time decision regarding more peeling or less peeling of the product. Second, it allows the operator to control the depth (height) of the product in the counter rotation thereby allowing operator to control the aggressiveness of peeling as well as process time simply by increasing product depth. This is because increasing the product depth increases the weight of the product in the counter rotation, and therefore increases the frictional contact of the lower tiers of product with the drum. Alternatively, by reducing product depth in the counter rotation, the operator can reduce the process time for the product and reducing cycle time. This is because as the product thickness decreases, the product travels a shorter distance to complete a full rotation cycle.

Third, allowing crops to exit from the top of the counter rotation allows the operator to be able to reduce the speed of the drum substantially without allowing unwanted product to fall through the gap. One of the most significant shortcomings of the systems disclosed in the prior art is that they do not allow the operator to reduce the drum speed beyond a certain level (typically no less than approximately 200 rpm). In the prior art, at lower drum speeds, the gap between the front plate and drum allows indiscriminate product outflow through this gap. Through the use of the adjustable lower gate in embodiments of the present invention, the operator can run the drum at any desired speed (even very low speeds) without concern that unprocessed product will prematurely exit.

In some embodiments, a single adjustable lower gate may be provided which may be raised to cause additional nut impingements to accomplish additional processing, or lowered or removed to reduce impingements if additional processing is not needed.

It is to be appreciated that in some embodiments, the positions of the upper and/or lower gate may be adjusted during processing in response to the particular batch of crops being processed by the machine. For example and without limitation, if the incoming nuts are more ripe, they may peel more easily, such that a larger and/or lower opening is desirable; if the nuts are less ripe, they may require additional peeling such that a smaller and/or higher opening is desirable. For any given batch of crops, if it is noted that a significant number of crops are exiting without being fully processed, the second gate may be installed and/or raised in order to induce additional impingements for increased processing, with or without also raising the upper gate.

By way of example and without limitation, the opening of the front plate may be as large as 6" by 6" when fully opened. Embodiments of the lower gate may have height of up to 3", leaving an opening of up to 3" above the lower gate, depending on whether the upper gate is also being used. The size and location of the opening depends on how full the machine is running. For example, and without limitation, an opening that is 3" tall and 6" wide can produce an output of 4 to 4.5 ton per hour.

In some embodiments, different nut varieties or vegetables may require more gentle hulling in order to avoid breakage. In such embodiments, the drum speed may be substantially reduced to accommodate a more gentle impingement. However, the slower the drum speeds, the more indiscriminate falling of the crops through this gate. Accordingly, in these embodiments the lower gate should preferably be installed in order to prevent these nuts or vegetables from falling out due to the lower drum speed.

Determining the appropriate position of the front plate opening relative to the drum (i.e., determining the positions of the upper and lower gates) may depend on a number of factors including without limitation the particular nut or vegetable variety being processed, the type of hull or peel to be removed, the level of ripeness, the thickness of the hulls or peels, the moisture content (dryness) of the hulls or peels, etc.

By way of example and without limitation, at the very beginning of the harvest season when a larger subpopulation of nuts is unripe, or at the very end of the season when most of the nuts come from the field with dried up hulls, the operator may decide to employ more aggressive peeling because the hulls are more hardened. In such cases, the front plate opening may be positioned at a very high location (lower plate 3" tall), so that the crops undergo considerable impingements before exiting (because they are blocked from exit by the tall lower plate, and because the weight of the depth of nuts forces them back down to the drum for additional impingements). So, in this example, the front plate opening may be 3" tall and 6" wide, and may be located 3" above the drum (See, e.g., FIG. 8C.).

However, in another example and without limitation, during the mid-season when the majority of incoming nut products are ripe, but there still is a small unripe subpopulation, the operator may choose a less aggressive peeling and faster process time for the product. In such cases, the operator may set the lower gate height to be only 1" or perhaps 2" tall. This will have the effect of reducing the depth of counter rotation thickness, reducing impingements and allowing crops to exit more quickly. So, in this example, the front plate opening may be 3" tall and 6" wide, and may be located about 1" or perhaps about 2" above the drum. (See, e.g., FIG. 8B.). In a related example and without limitation, if the operator is processing pistachio varieties that require very gentle peeling to avoid breakage, the operator can reduce the drum speed but maintain the lower gate height at around 1" or 2" in order to achieve less aggressive peeling, faster process time while preventing indiscriminate outflow of the product through the opening above the lower gate.

In another example and without limitation, there may be periods of time during harvest when the incoming product from the field gets hulled substantially before reaching the center opening on the drum. During these times, there is no need to have the bottom gate at all, since no additional impingements are necessary. In such cases the 3" by 6" opening can be placed at the very bottom of the front plate above the drum, and/or the size of the opening can be enlarged to the full size opening of 6" by 6". In such situations, product discharge is so fast that virtually no product remains at the center of the drum. Hence, there will be no resistance against product for moving to the center in short order, which allows for much shorter process time, which itself in turn, allows for substantial capacity increase. Similarly, if the operator is peeling vegetables, the same setting may be chosen (no lower gate) since vegetables may not require a long process time, and this setting will allow substantial capacity increase. (See, e.g., FIG. 8A.).

In another example and without limitation, if the incoming crop has soft skin, the crop will need fewer impingements to complete hulling/peeling, so the lower gate is not raised very high so that the crop only encounters a few impingements before being discharged through the opening. In another example and without limitation, if the incoming crop has very soft outer skin, this crop may need a slower drum rotation speed, as well as fewer impingements, to avoid breakage, so the drum speed is reduced and the lower gate is not set very high to not only reduce impingements but also reduce the force of such impingements.

It is to be appreciated that the above examples illustrate different vertical locations for the front plate opening, and that the width of this opening may also be adjusted depending on the same factors including without limitation the particular nut or vegetable variety being processed, the type of hull or peel to be removed, the level of ripeness, the thickness of the hulls or peels, the moisture content (dryness) of the hulls or peels, etc. In embodiments having a central front plate opening, crops are introduced at the two ends of the drum so that by the time they reach the central opening, they have been thoroughly processed. These embodiments may work in conjunction with patterns of protrusions on the drum which urge the crops toward the center, such patterns including, without limitation, chevron and herring bone patterns. The size, shape, number and positions of protrusions in these patterns (pattern criteria) may be adjusted in order to change the way the crops are moved toward the central opening in the front plate.

It is often desirable for the crops to encounter as many impingements as possible as they travel toward the central opening, it being understood that the more numerous the impingements that are likely to occur, the more likely that most if not all crops will be hulled or peeled by the time they reach the central opening. However, excessive impingements may lead to nut breakage. Accordingly, adjusting the positions and tilt of the front and back plates, adjusting the size and height of the opening in the front plate, adjusting the pattern for urging the nuts toward the center, adjusting the drum speed, and other adjustments made possible by embodiments of the present invention will allow an appropriate amount of impingement to be established for the most thorough processing without nut breakage.

In some embodiments, the drum protrusion criteria may be established such that the nuts take additional time to reach center, thereby facilitating additional impingements and more complete hulling. Similarly, use of the lower gate may increase the amount of time that the nuts are processed before exiting, thereby facilitating additional impingements and more complete hulling. Accordingly, more thorough processing may be accomplished in embodiments of the invention which use protrusion criteria that urge the nuts more slowly toward the center and/or embodiments which use a second lower gate in the central opening of the front plate.

However, in many harvest situations, it is neither desirable nor advisable to slow down throughput of processed nuts, since the processing time window may be short. Thus, in embodiments of the present invention, additional impingements may be accomplished by utilizing a high positioned and steeper back plate which causes the nuts to fall more quickly back onto the drum. Additional impingements may be accomplished by utilizing front and back plates that are relatively close to each other to cause tighter and faster moving counter rotation of nuts and more impingements in a given time interval. Accordingly, embodiments of the invention are provided which utilize a steeper back plate and/or closely positioned front and back plates in conjunction with drum protrusion and pattern criteria and/or use of the lower gate to allow for more impingements and therefore more complete hulling of nuts without increasing processing time.

Figure 2:
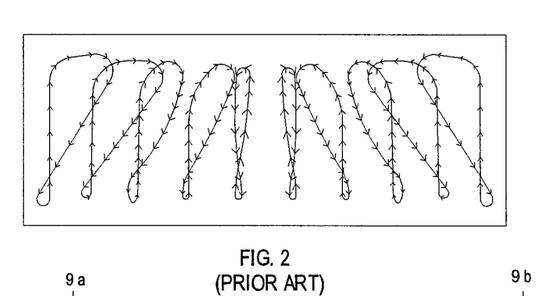
FIG. 2 is a top schematic view of counter rotational patterns of prior art hulling apparatus.

It is to be appreciated that the aspects of the closeness of the front and back plates to each other, the small angles of the front and back plates, the sizes and shapes of the bolts provided on the drum, and the patterns/locations of the bolts on the drum each contribute, independently and collectively, to a tight and fast rotational pattern of nuts in embodiments of the present invention, which increases impingements and therefore improves peeling without increasing the time it takes to accomplish it. A typical rotational pattern from prior art devices such as those described in the '518 application is shown in FIGS. 2A and 2B which may be contrasted to the tight rotational pattern from an embodiment of the present invention shown in FIGS. 3 and 3A. It is to be appreciated that the number of impingements encountered in embodiments of the present invention having a tighter and faster counter rotation may be significantly greater than those of the prior art.

In some embodiments, the width of the central opening in the front plate may also be adjusted using one or two side gates. The narrower the width of the opening, the longer it takes the nuts to travel from the sides to the center, resulting in multiple impingements as this takes place. Accordingly, if time is not a factor, more thorough processing may be accomplished by using a narrower central opening in conjunction with protrusion criteria that urge the nuts toward the center. This will result in additional impingement and more complete processing of the nuts. However, if time is a factor, in embodiments of the present invention, additional impingements may be accomplished by utilizing a steeper back plate which causes the nuts to fall more quickly back onto the drum and/or utilizing front and back plates that are mounted relatively close to each other, and/or bolt shapes and/or patterns that facilitate multiple impingements thereby making up for any additional processing time caused by the presence of the lower gate.

It is often desirable to remove the drum in order to replace it with another drum having a different diameter, different bolt shape and/or different bolt pattern, or for maintenance, inspection or cleaning. In existing hulling machines, this often involves a significant disassembly of the machine, including removal of the front plate, the back plate, or both, in order to gain access to the drum. This may result in significant down time which could be crucial during the short window of the harvest season. In embodiments of the present invention, the back plate is either located directly above the drum (at 12:00 on a clock face), or in the same quadrant as the front plate; the back plate is not located in a different quadrant than the front plate. This allows for the drum to be removed laterally without having to disassemble either the front plate or the back plate, which facilitates rapid and easy removal and replacement of the drum.

It is therefore an object of the present invention to provide methods and apparatus for quickly and efficiently hulling or peeling high percentages of nuts or vegetables, particularly pistachios.

It is a further object of the present invention to provide methods and apparatus for increasing the percentage of nuts or vegetables hulled or peeled within a given time frame by increasing the number of impingements between the nuts or vegetables and the protrusions on a rotating drum.

It is a further object of the present invention to provide methods and apparatus for increasing the percentage of nuts or vegetables hulled or peeled within a given time frame by increasing the tightness and/or speed of counter rotation of the nuts or vegetables as they are being processed.

It is a further object of the present invention to provide methods and apparatus for increasing the percentage of nuts or vegetables hulled or peeled within a given time frame by allowing the starting positions and tilt angles of front and back plates to be adjusted for optimum performance.

It is a further object of the present invention to provide methods and apparatus for increasing the percentage of nuts or vegetables hulled or peeled within a given time frame by providing a high starting position for the back plate in embodiments of the invention.

It is a further object of the present invention to provide methods and apparatus for increasing the percentage of nuts or vegetables hulled or peeled within a given time frame by providing a vertical or very steep angle for the back plate in embodiments of the invention.

It is a further object of the present invention to provide methods and apparatus for increasing the percentage of nuts or vegetables hulled or peeled within a given time frame by providing a vertical or very steep angle for the front plate in embodiments of the invention.

It is a further object of the present invention to provide methods and apparatus for increasing the percentage of nuts or vegetables hulled or peeled within a given time frame by providing front and back plates in relatively close proximity to each other in embodiments of the invention where both are in a single quadrant.

It is a further object of the present invention to provide methods and apparatus for increasing the percentage of nuts or vegetables hulled or peeled within a given time frame by providing an adjustable central opening in the front plate in embodiments of the invention.

It is a further object of the present invention to provide methods and apparatus for increasing the percentage of nuts or vegetables hulled or peeled within a given time frame by providing a pattern of protrusions on the drum which gently urge the nuts toward a central opening in the front plate in embodiments of the invention.

It is a further object of the present invention to provide methods and apparatus for increasing the percentage of nuts or vegetables hulled or peeled and reducing breakage within a given time frame by providing specially sized and shaped protrusions on the drum in embodiments of the invention.

It is a further object of the present invention to provide methods and apparatus for hulling or peeling nuts or vegetables where the drum may be easily removed and replaced because the front and back plates are located in the same quadrant.

Additional objects of the invention will be apparent from the detailed descriptions and the claims herein.

BRIEF DESCRIPTION OF THE DRAWINGS

FIG. 2A is a side schematic view of a counter rotational pattern of prior art hulling apparatus.

FIG. 3A is a side schematic view of a counter rotational pattern of embodiments of the present invention.

DETAILED DESCRIPTION

Figure 5:
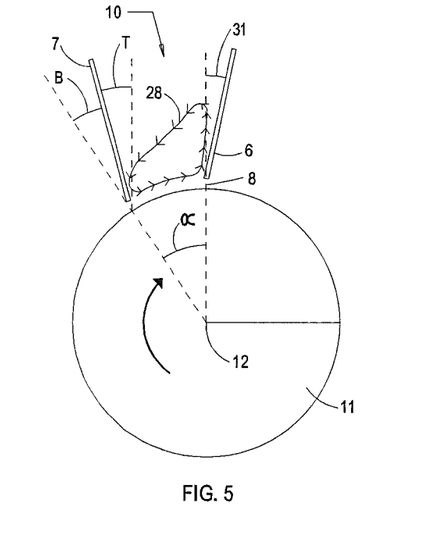
FIG. 5 is a schematic view showing exemplary angles $\alpha, \beta$ and T with respect to the front plate and back plate of an embodiment of the invention.

Referring to the drawings wherein like reference characters designate like or corresponding parts throughout the several views, and referring particularly to FIGS. 3A, 4 and 5, it is seen that the embodiments of the invention shown in these illustrations include a rotatable drum 11 having a central axis 12, the drum being located at the bottom of a hopper area 10 of a hulling apparatus for receiving harvested crops 17 such as nuts or vegetables from which the outside hulls, skins or peels 18 are to be removed, resulting in processed crops 19 that have been hulled, peeled and/or skinned. The drums of embodiments of the present invention are provided with upwardly extending protrusions, impingement structures or bolts 14 on the surface of the drum. The protrusions 14 are ordinarily provided in a pattern 15. The protrusions 14 are designed to impinge against the incoming crops 17 that come into contact with the drum for the purpose of frictionally removing the exterior skins, peels or hulls 18 from the crops.

Embodiments of the present invention are provided with an adjustable back plate 6 and an adjustable front plate 7 mounted in the vicinity of the drum 11. The area between the front and back plates generally defines a hopper 10 of the apparatus. In the embodiments illustrated herein, the rotational direction of the drum is shown to be clockwise; however it is to be appreciated that the drums of embodiments of the present invention may alternatively rotate in a counter-clockwise direction, and if so, the positioning of the other elements of the embodiments of the invention would be provided in mirror-image positions relative to such counter-clockwise rotating drums.

Placing the crops 17 into the hopper area 10 of embodiments of the invention causes the crops to come into contact with the protrusions 14 of the drum; and the rotation of the drum 11 causes the crops to come into contact with back plate 6. The position of the back plate 6 in conjunction with the protrusions on the drum cause frictional impingements (hits or contacts) which contribute to the removal of the exterior skins, peels or hulls 18 from the crops without increasing breakage, and with little or no increase in processing times.

In embodiments of the invention, using particular locations and angles for the front and back plates causes increased impingement of the crops and results in more efficient removal of the exterior hulls 18. Embodiments of the invention include methods and apparatus wherein the bottom or starting position of the adjustable back plate 6 relative to the drum 11 is located at a position directly above the drum at or near top dead center (12:00 on a clock face), with the edge of the back plate being above the surface of the drum, and parallel to the axis 12 of the drum. In some embodiments, the bottom of the back plate may be located as much as about 3 degrees down from top dead center in the upstream direction of drum rotation, and in same quadrant as the front plate. (See, e.g., FIG. 9A.) For a drum rotating in a clockwise direction, the bottom of an exemplary back plate located 3 degrees down from top dead center would be located at around 11:59:30 on a clock face. In all embodiments, the adjustable front plate 7 is located in the upstream quadrant below top dead center (e.g., between 9:00 and 12:00 on a clock face if the drum is rotating clockwise).

In embodiments of the invention, the top of the back plate 6 may be angled or tilted from the bottom of the back plate (pivoted) in a direction away from the front plate 7 at an angle 31 of between about zero (0=vertical) and about 15 degrees. It has been observed that some crops tend to accumulate on the back plate 6 if it is tilted at an angle of 20 degrees or more, resulting in a preferred range for angle 31 of between about 0 and about 15 degrees. Referring to the exemplary embodiment illustrated in FIG. 5, it is seen that the bottom of back plate 6 in this example is located at top dead center (12:00), and that back plate 6 is tilted in an angle 31 of about 10 degrees away from the front plate 7.

In embodiments of the invention, the distance between the bottom of back plate 6 and the surface of drum 11 may be adjustable such that a gap 8 may be formed between the back plate 6 and the drum 11. It is to be appreciated that peels and removed hull fragments 18 that are dislodged during the impingement process exit through this gap 8. For embodiments hulling pistachio nuts, this gap may be from between about 3 mm and about 5 mm high. Although gap 8 is not necessarily dependent on the height of the protrusions 14 on the drum, in some embodiments it may be approximately 1 mm above the tops of these protrusions. This allows the hulls 18 to exit, but not the nuts themselves 19. In other embodiments, the size of gap 8 may be from between about 2 mm and about 5 mm so as to allow for peels and removed hull fragments 18 to exit, while preventing hulled crops 19 from also exiting through gap 8. In some embodiments, gap 8 may be larger in order to accommodate larger sized products, such as walnuts.

Embodiments of the invention include methods and apparatus wherein the bottom or starting position of the adjustable front plate 7 relative to the drum 11 is located at a position upstream from the back plate 6 with respect to the rotation of the drum. In preferred embodiments for hulling pistachios, this starting position of the bottom of the front plate 7 is around 37 degrees below top dead center, or just below 11:00 on a clock face if the drum is rotating clockwise. However, depending on the application of the formula described below, the starting position of the bottom of the front plate 7 may be anywhere from about 25 to about 50 degrees down from top dead center, but preferably between about 27 degrees and 42 degrees down from top dead center.

In embodiments of the invention, the top of the front plate 7 may be angled or tilted from the bottom of the front plate (pivoted) in a direction away from the back plate 6 at an angle 37 (T) of between about zero (0=vertical) and about 15 degrees. It has been observed that crops tend to accumulate on the front plate 7 if it is tilted at an angle of 20 degrees or more, resulting in a preferred range for angle T of between about 0 and about 15 degrees. Referring to the exemplary embodiment illustrated in FIG. 5, it is seen that the bottom of front plate 7 is located at 37 degrees down from top dead center in an upstream direction, and that front plate 7 is tilted in an angle T of about 10 degrees from vertical with the top leaning away from the back plate 6.

In embodiments of the present invention, it has been determined that three different angles are important to improved throughput and reducing breakage in nuts such as pistachios. (See FIGS. 4 & 5.) The first angle 35 (alpha or α) is the location of the bottom of the front plate 7 relative to the bottom of the back plate 6 taken from the center of the drum 12 in a cross section view. By way of example, and without limitation, for an embodiment with a 20" drum having a radius of 10" (ten inches) where r=10, and a back plate 6 having its bottom located at top dead center, it has been determined that for hulling pistachios a preferred angle alpha (α) should be approximately 37°.

The next important angle 36 (beta or β) is the angle of the front plate 7 itself toward the back plate 6, based on the position of the bottom of the front plate along the drum. It has been determined that this angle should almost always be approximately 27° in a direction toward the back plate when hulling pistachios. The final angle 37 (tilt or T) is the angle between the front plate 7 and a vertical line at that point of the drum. The relationship between the three angles is described in the following formula: Alpha−beta=T (α−β=T). However, T should not be greater than 20° because any larger tilt would result in piling up (dead zones) of nuts against the front plate 7, and any T of less than zero could result in nut breakage.

Referring to the exemplary embodiment of FIG. 5, the bottom of the front plate 7 is located 37° down from top dead center (α=37), so it's starting position would extend out radially at 37°. This is a preferred starting location for hulling pistachios. Front plate 7 is then be slanted 27° toward the back plate (β=27), which results in the front plate having a tilt of 10° (T=10) away from vertical. Since beta is almost always 27 degrees when hulling pistachios, and T should not be greater than 20 and less than zero, then α−27=T or α=T+27. Based on this formula the possible range for a would be 27 (when T=0) to 47 degrees (when T=20). So by way of example, if a is selected to be 40 degrees, then angle T would be 13 degrees (40−27=13). (See FIG. 9C.). When embodiments of the invention are used to hull nuts, particularly pistachios, it is to be appreciated that a front plate located 42° or more down from top dead center or located 27° or less from top dead center could lead to increased nut breakage and/or dead zones on the plates. However, these limitations do not necessarily apply to vegetables (carrots, potatoes, etc.) or nuts other than pistachios.

Figure 9:
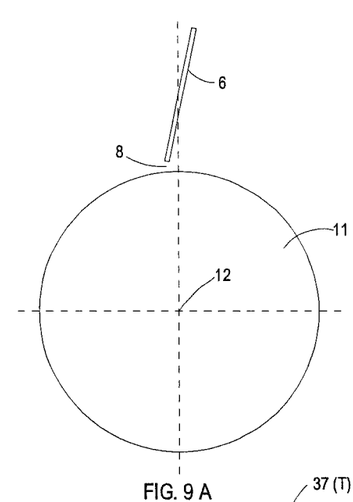
FIGS. 9A-9C are side schematic views of different examples of possible positions and angles of front and back plates of embodiments of the present invention.
Figure 10:
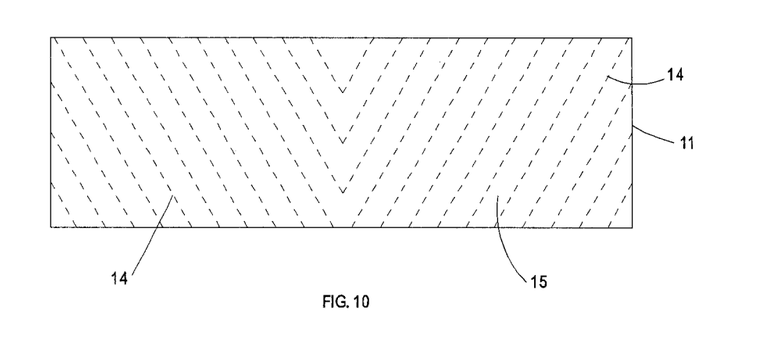
FIG. 10 is a view of an exemplary pattern of protrusions provided on the surface of a drum according to an embodiment of the invention.

Referring to the exemplary embodiment of FIG. 9B, the bottom of the front plate 7 is located 27 degrees down from top dead center, so angle 35 (α) is 27 degrees, and the starting position for front plate 7 would extend out radially at 27 degrees. In FIG. 9B, front plate 7 has been slanted 27 degrees toward the back plate 6, so angle 36 (β) is also 27 degrees. This results in bringing the front plate 7 to vertical (T=0).

Referring to the exemplary embodiment of FIG. 9C, the bottom of the front plate 7 is located 40 degrees down from top dead center, so angle 35 (α) is 40 degrees, and the starting position for front plate 7 would extend out radially at 40 degrees. In FIG. 9C, front plate 7 has been slanted 27 degrees toward the back plate 6, so angle 36 (β) is 27 degrees. This gives the front plate 7 a tilt of 13 degrees away from vertical (T=13).

Figure 3:
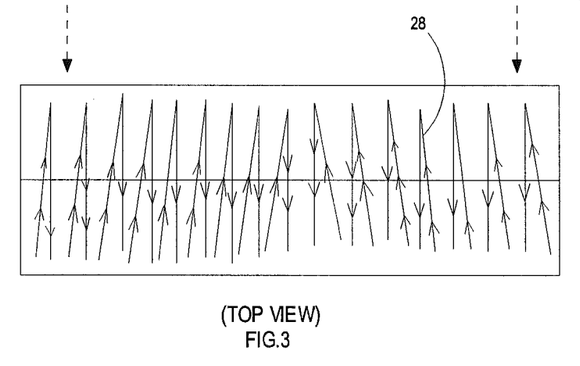
FIG. 3 is a top schematic view of a counter rotational pattern of embodiments of the present invention.

Embodiments of the invention include methods and apparatus wherein a central opening 21 is provided in the front plate 7 through which processed crops 19 may exit. In these embodiments, crops are introduced through one or more infeeds located at or near opposite ends 9a, 9b of the drum 11 and are urged toward the center of the drum using various patterns 15 including, without limitation, chevron and herring bone patterns. These patterns alone or in conjunction with the positioning of the front plate 7 and back plate 6, cause the crops to move in tight counter-rotational patterns 28 as shown in FIGS. 3 and 3A. Depending on the height and position of opening 21, it is possible for the crops in these patterns 28 to encounter a high or a low number of impingements before reaching the central opening 21 where they exit in a processed condition 19.

In these embodiments, opening 21 is located near the center of the front plate 7 above the drum 11. In most embodiments, the length and width of opening 21 may be varied using one or more adjustable gates. The size of the opening 21 may be adjusted in advance, or in real time during processing. In these embodiments, adjustment of the height of the opening 21 may be accomplished using one or two adjustable gates. In many embodiments, a first adjustable gate 22 (upper gate) is provided above opening 21 which may be raised to increase the size of the opening, or lowered to decrease the size of the opening. In most embodiments, a second gate 23 may also be provided below the opening (lower gate) which prevents crops at or near the drum surface from exiting through opening 21. It is to be appreciated that by coordinating the positions of these two gates, the opening 21 between them may be raised or lowered relative to the drum.

It is to be appreciated that by increasing the heights of the first 22 and second 23 gates, the opening 21 may be moved higher such that crops near the top of the counter rotation 28 may exit, while crops at or near the drum surface are likely to receive additional impingements which may be desirable for more thorough processing (hulling/peeling) of these crops as they work their way toward the top of the counter rotation. Similarly, by lowering the heights of the first and second gates, the opening 21 is moved lower such that crops in lower levels of the counter rotation 28 are allowed to exit the machine, which may be desirable if the crops require fewer impingements for peeling.

In some embodiments, a single adjustable lower gate 23 may be provided below a large opening 21 which may be raised to cause additional nut impingements to accomplish additional processing, or lowered to reduce impingements if additional processing is not needed.

In some embodiments no lower gate may be provided, and a single adjustable upper gate 23 may be provided which may be raised to increase the size of opening 21 resulting in fewer impingements before the crops are able to exit, or lowered to reduce the size of the opening and increase impingements if additional processing is needed.

By way of example and without limitation, an opening 21 may be as large as 6" by 6" when fully opened, and embodiments of the lower gate 22 may have height of up to 3", leaving an opening of up to 3" above lower gate 22, depending on whether the upper gate 23 is also being used. It is to be appreciated that the size and location of the opening 21 may be adjusted depending on how full the machine is running, and that the upper and lower gates 22, 23 may be used to adjust the opening 21 upward in order to only allow crops near the top of the pile to exit. In some embodiments, adjustable left and right side gates 25, 26 may also be provided to widen or narrow the width of opening 21, or move the lateral position of opening 21 left or right.

It is to be appreciated that in alternative embodiments, two similarly adjustable openings may be provided on either side of front plate 7, the crops may be introduced above the center of drum 11, and the patterns 15 of protrusions on the drum urge the crops away from the center and toward the two side openings.

By way of example and without limitation, if the incoming product from the field is substantially hulled before reaching the center opening on the drum, there may be no need to have the bottom gate at all, since no additional impingements are necessary. In such cases a 3" by 6" opening 21 can be placed at the very bottom of the front plate above the drum without any lower gate, as shown in the exemplary embodiment of FIG. 8A.

Figure 8B:
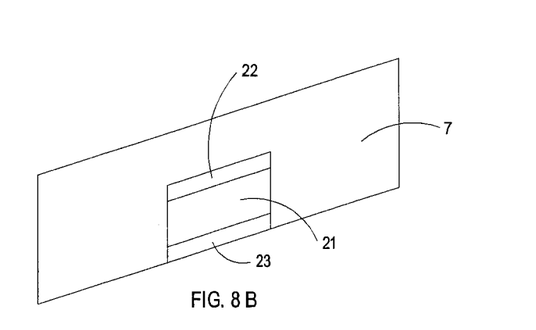
Figure 8C:
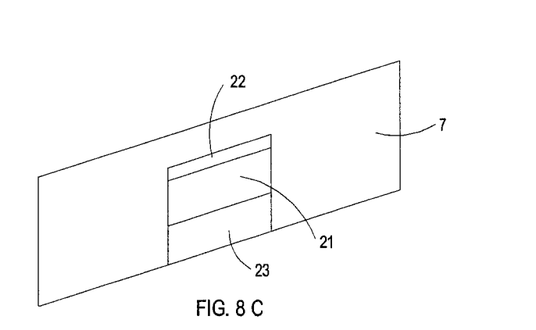

By way of example and without limitation, if the operator decides to employ aggressive peeling because the hulls are more hardened, the front plate opening 21 may be positioned at a very high location (e.g., the lower plate 23 may be up to about 3" tall), so that the crops undergo considerable impingements before exiting, as shown in the exemplary embodiment of FIG. 8C.

However, in another example and without limitation, if the majority of incoming nut products are ripe, but there still is a small unripe subpopulation, the operator may choose a less aggressive peeling and faster process time for the product, and may set the height of the lower gate 23 to be only around 1" or perhaps around 2" tall as shown in the exemplary embodiment of FIG. 8B.

Figure 7:
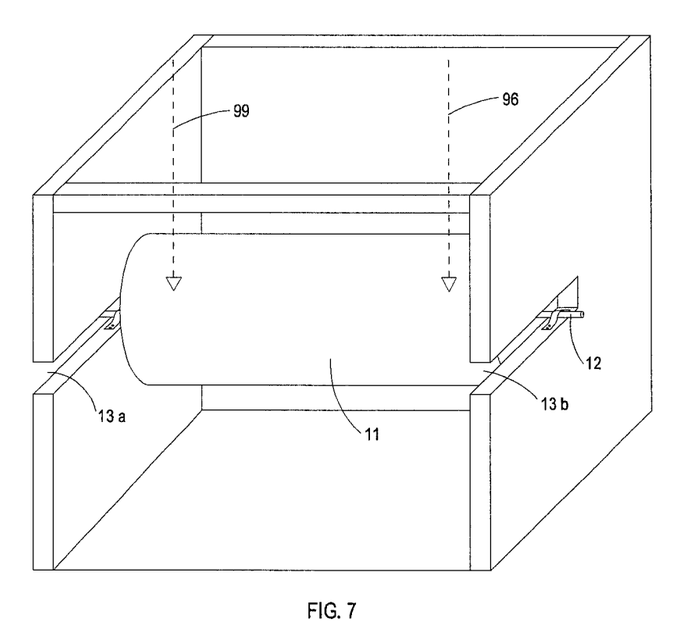
FIG. 7 is a perspective view of an embodiment of the invention illustrating exemplary drum removal.

Referring to the embodiment of FIG. 7, it is seen that drum 11 may be inserted or removed in a lateral direction along slots 13a and 13b of the machine, without disassembly of the machine nor removal of either back plate 6 or front plate 7. This is possible because in embodiments of the invention, both back plate 6 and front plate 7 may be located in the same quadrant, which is on the opposite side of the machine from drum removal slots 13.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An apparatus for hulling or peeling harvested crops comprising:
   a. a rotatable drum having a generally horizontal orientation, a central axis of rotation, and a plurality of protrusions located on an exterior surface thereof, said drum being positioned below at least one infeed through which incoming crops to be hulled or peeled are introduced;
   b. an adjustable back plate provided adjacent to said drum surface and positioned parallel to said axis of rotation; and
   c. an adjustable front plate provided adjacent to said drum surface and positioned parallel to said axis of rotation, said front plate having a central opening located thereon through which processed crops may exit.

2. The apparatus of claim 1 wherein the protrusions on said drum are provided in a pattern which urges the crops toward the center of the drum when the drum is rotated.

3. The apparatus of claim 2 wherein said at least one infeed comprises a pair of crop infeeds provided near opposite ends of said drum.

4. The apparatus of claim 1 wherein a first adjustable gate is provided above said central opening for adjusting the position of the top of said opening.

5. The apparatus of claim 4 wherein a second adjustable gate is provided below said central opening for adjusting the position of the bottom of said opening.

6. The apparatus of claim 5 wherein said opening has a total height of about six inches, said first gate is positioned to cover about two inches at the top of said opening, and said second gate is positioned to cover about one inch of the bottom said opening.

7. The apparatus of claim 5 wherein the distance between said front plate and said drum is adjustable.

8. The apparatus of claim 5 wherein the distance between said back plate and said drum is adjustable.

9. The apparatus of claim 5 wherein the distance between said back plate and the surface of said drum is between about 1 mm and about 5 mm.

10. The apparatus of claim 5 wherein the distance between said back plate and tops of protrusions on said drum is approximately 1 mm.

11. The apparatus of claim 1 wherein said front plate and said back plate are located in the same quadrant.

12. The apparatus of claim 1 wherein said back plate has a bottom and a top, and wherein the bottom of said back plate is provided at a location between about top dead center of said drum and about three degrees down from top dead center of said drum upstream of the rotational direction of said drum.

13. The apparatus of claim 12 wherein said front plate has a bottom and a top, and wherein the bottom of said front plate is provided at a location between about 25 degrees and about 50 degrees down from top dead center of said drum, upstream of the rotational direction of said drum.

14. The apparatus of claim 13 wherein the top of said back plate is tilted away from said front plate at an angle of between about zero degrees and about fifteen degrees.

15. The apparatus of claim 13 wherein the top of said front plate is tilted away from said back plate at an angle of between about zero degrees and about fifteen degrees.

16. The apparatus of claim 13 wherein the bottom of said back plate is located around top dead center, and the bottom of said front plate is located at about 27 degrees down from top dead center.

17. The apparatus of claim 16 wherein both said back plate and said front plate have a vertical orientation.

18. The apparatus of claim 13 wherein the bottom of said back plate is located around top dead center, and the bottom of said front plate is located at about 37 degrees down from top dead center.

19. The apparatus of claim 18 wherein the top of said back plate is tilted away from said front plate at an angle of about ten degrees, and said front plate is tilted away from said back plate at an angle of about ten degrees.

20. The apparatus of claim 12 wherein said front plate has a bottom and a top, and wherein the bottom of said front plate is provided at a location between about 27 degrees and about 42 degrees down from top dead center of said drum, upstream of the rotational direction of said drum.

21. The apparatus of claim 1 wherein a first adjustable side gate is provided on one side of said central opening for adjusting the size of said opening.

22. The apparatus of claim 21 wherein a second adjustable side gate is provided on an opposite side of said central opening for adjusting the size of said opening.

23. A method of hulling or peeling crops comprising the steps of
   a. introducing said crops into a hopper above a horizontally oriented rotating drum, said drum having a plurality of protrusions located thereon;
   b. said crops coming into contact with a back plate located adjacent to said drum such that the crops are frictionally impinged by the protrusions on said drum causing peels or hulls to be removed from said crops and exit below said back plate;
   c. said crops being moved in a counter rotational direction with respect to the rotation of said drum such that said crops come into contact with a front plate located upstream from said back plate and adjacent to said drum; and
   d. said impinged crops exiting through a central opening on said front plate.

24. The method of claim 23 comprising the additional step of adjusting the position of said front plate opening upward in order to cause additional impingements of said crops before exiting.

25. The method of claim 23 comprising the additional step of adjusting the position of said front plate opening downward in order to cause fewer impingements of said crops before exiting.

26. The method of claim 23 comprising the additional step of tilting said back plate away from said front plate at an angle of no more than fifteen degrees.

27. The method of claim 26 comprising the additional step of tilting said front plate away from said back plate at an angle of no more than fifteen degrees.

28. The method of claim 23 wherein the protrusions on said drum are provided in a pattern which urges the crops toward the center of the drum when the drum is rotated.

29. The method of claim 23 wherein the crops are introduced at opposite ends of the drum.

30. An apparatus for hulling or peeling harvested crops comprising:
   a. a rotatable drum having a generally horizontal orientation, a central axis of rotation, and a plurality of protrusions located on an exterior surface thereof, said drum being positioned below at least one infeed through which incoming crops to be hulled or peeled are introduced;
   b. an adjustable back plate provided adjacent to said drum surface and positioned parallel to said axis of rotation, wherein said back plate has a bottom and a top, and the bottom of said back plate is provided at a location between about top dead center of said drum and about three degrees down from top dead center of said drum upstream of the rotational direction of said drum; and
   c. an adjustable front plate provided adjacent to said drum surface and positioned parallel to said axis of rotation, wherein said front plate has a bottom and a top, and the bottom of said front plate is provided at a location between about 25 degrees and about 50 degrees down from top dead center of said drum, upstream of the rotational direction of said drum.

31. The apparatus of claim 30 wherein the bottom of said front plate and the bottom of said back plate are located in the same quadrant on the same side of a vertical axis of the drum.

32. The apparatus of claim 30 wherein the top of said back plate is tilted away from said front plate at an angle of between about zero degrees and about fifteen degrees.

33. The apparatus of claim 30 wherein the top of said front plate is tilted away from said back plate at an angle of between about zero degrees and about fifteen degrees.

34. The apparatus of claim 30 wherein the bottom of said back plate is located around top dead center, and the bottom of said front plate is located at about 27 degrees down from top dead center.

35. The apparatus of claim 34 wherein both said back plate and said front plate have a vertical orientation.

36. The apparatus of claim 30 wherein the bottom of said back plate is located around top dead center, and the bottom of said front plate is located at about 37 degrees down from top dead center.

37. The apparatus of claim 36 wherein the top of said back plate is tilted away from said front plate at an angle of about ten degrees, and said front plate is tilted away from said back plate at an angle of about ten degrees.

38. The apparatus of claim 30 wherein the bottom of said front plate is located on one side of a vertical axis of said drum, and the bottom of said back plate is located at or below said vertical axis on the same side of the drum as the front plate.

39. An apparatus for hulling or peeling harvested crops comprising:
- a. a rotatable drum having a generally horizontal orientation, a central axis of rotation, and a plurality of protrusions located on an exterior surface thereof, said drum being positioned below at least one infeed through which incoming crops to be hulled or peeled are introduced;
- b. an adjustable back plate provided adjacent to said drum surface and positioned parallel to said axis of rotation; and
- c. an adjustable front plate provided adjacent to said drum surface and positioned parallel to said axis of rotation, said front plate having a central opening located thereon through which processed crops may exit; and
- d. at least one adjustable gate associated with said central opening for adjusting the size of said central opening.

40. The apparatus of claim 39 wherein said at least one adjustable gate comprises an upper gate.

41. The apparatus of claim 39 wherein said at least one adjustable gate comprises a lower gate.

42. The apparatus of claim 39 wherein said at least one adjustable gate comprises an upper gate and a lower gate.

43. The apparatus of claim 39 wherein said at least one adjustable gate comprises a side gate.

44. The apparatus of claim 39 wherein said at least one adjustable gate comprises a left side gate and a right side gate.

* * * * *